(12) United States Patent
Harriman

(10) Patent No.: US 11,606,363 B2
(45) Date of Patent: Mar. 14, 2023

(54) GEOGRAPHICAL VERIFICATION OF DIGITAL ACCOUNT RECORDS

(71) Applicant: Nextdoor, Inc., San Francisco, CA (US)

(72) Inventor: Justyn Harriman, San Francisco, CA (US)

(73) Assignee: NEXTDOOR, INC., San Francisco, CA (US)

( * ) Notice: Subject to any disclaimer, the term of this patent is extended or adjusted under 35 U.S.C. 154(b) by 315 days.

(21) Appl. No.: 17/009,690

(22) Filed: Sep. 1, 2020

(65) Prior Publication Data

US 2022/0070175 A1    Mar. 3, 2022

(51) Int. Cl.
| | |
|---|---|
| H04L 29/06 | (2006.01) |
| H04L 9/40 | (2022.01) |
| G06F 16/23 | (2019.01) |
| G06F 16/587 | (2019.01) |
| G06V 20/00 | (2022.01) |

(52) U.S. Cl.
CPC ........ *H04L 63/107* (2013.01); *G06F 16/2379* (2019.01); *G06F 16/587* (2019.01); *G06V 20/00* (2022.01); *H04L 63/102* (2013.01)

(58) Field of Classification Search
None
See application file for complete search history.

(56) References Cited

U.S. PATENT DOCUMENTS

| | | | |
|---|---|---|---|
| 8,732,091 | B1 | 5/2014 | Abhyanker |
| 8,738,545 | B2 | 5/2014 | Abhyanker |
| 8,769,393 | B1 | 7/2014 | Abhyanker |
| 8,775,328 | B1 | 7/2014 | Abhyanker |
| 2007/0218900 | A1 | 9/2007 | Abhyanker |
| 2007/0219659 | A1 | 9/2007 | Abhyanker et al. |
| 2007/0219712 | A1 | 9/2007 | Abhyanker |
| 2008/0117928 | A1 | 5/2008 | Abhyanker |
| 2008/0240397 | A1 | 10/2008 | Abhyanker |
| 2008/0250025 | A1 | 10/2008 | Abhyanker |
| 2009/0024740 | A1 | 1/2009 | Abhyanker |
| 2009/0061902 | A1 | 5/2009 | Abhyanker |
| 2009/0064144 | A1 | 5/2009 | Abhyanker |
| 2011/0311094 | A1* | 12/2011 | Herzog .............. G06Q 30/0261 345/441 |

(Continued)

OTHER PUBLICATIONS

Wiesen, U.S. Appl. No. 90/014,696, filed Mar. 31, 2021, Determination—Reexam Ordered, May 18, 2021.

(Continued)

*Primary Examiner* — Andrew J Steinle
(74) *Attorney, Agent, or Firm* — Hickman Becker Bingham Ledesma LLP; Malgorzata A. Kulczycka

(57) ABSTRACT

A method and apparatus for generation and implementation of location-based testing and verification is provided. In various implementations, location-based testing is generated and administered in response to a user requesting verification of an account with a location or other community trait. In various further implementations, location-based testing is improved by soliciting and utilizing digital representations of traits or locations to improve testing procedures. In various further implementations, machine learning and verified community feedback is employed to improve location-based testing.

20 Claims, 11 Drawing Sheets

(56) References Cited

U.S. PATENT DOCUMENTS

| | | |
|---|---|---|
| 2014/0100900 A1 | 4/2014 | Abhyanker |
| 2014/0108556 A1 | 4/2014 | Abhyanker |
| 2014/0136328 A1 | 5/2014 | Abhyanker |
| 2014/0136624 A1 | 5/2014 | Abhyanker |
| 2014/0149244 A1 | 5/2014 | Abhyanker |
| 2014/0195350 A1 | 7/2014 | Abhyanker |
| 2014/0195629 A1 | 7/2014 | Abhyanker |
| 2014/0222577 A1 | 8/2014 | Abhyanker |
| 2014/0230025 A1 | 8/2014 | Abhyanker |
| 2014/0230030 A1 | 8/2014 | Abhyanker |
| 2014/0236542 A1* | 8/2014 | Abhyanker ............ H04W 4/21 703/1 |
| 2014/0236753 A1 | 8/2014 | Abhyanker |
| 2014/0237051 A1 | 8/2014 | Abhyanker |

OTHER PUBLICATIONS

Tolia, U.S. Appl. No. 90/014,698, filed Mar. 30, 2021, Determination—Reexam Ordered, May 14, 2021.

Tolia, U.S. Appl. No. 90/014,697, filed Mar. 31, 2021, Determination—Reexam Ordered, May 14, 2021.

Tolia, U.S. Appl. No. 90/014,694, filed Mar. 27, 2021, Determination—Reexam Ordered, May 14, 2021.

Tolia, U.S. Appl. No. 90/014,693, filed Mar. 30, 2021, Determination—Reexam Ordered, May 14, 2021.

Donahoe, U.S. Appl. No. 90/014,695, filed Apr. 1, 2021, Determination—Reexam Ordered, May 18, 2021.

Complaint, filed Mar. 3, 2021, in the United States District Court Northern District of California, Case No. 3:21-cv-1534, 333 pages, Mar. 3, 2021.

* cited by examiner

GEOGRAPHICAL VERIFICATION OF DIGITAL ACCOUNT RECORDS

FIELD OF THE DISCLOSURE

One technical field of the present disclosure is computer-implemented social networking systems including online community and electronic networking. Another technical field is computer security, including location-based verification and geographic grouping of account data. Another technical field is verification test generation and sourcing.

BACKGROUND

Online communities and digital networking are rapidly growing and increasingly complex fields. Connectivity between digital groups continues to increase at exponential paces as more users consume and interact with personal and public internet profiles, pages, offers, and many other internet mediums on a daily basis. Social networking and social media as examples of online communities, in particular, have permitted interconnectivity in ways previously thought impossible. Profile and page based online community platforms allow users to interact with a near infinite variety of acquaintances, strangers, businesses, peers, co-workers, neighbors, and other entities.

One particularly useful feature of online communities is the ability to group and engage with specific members of an online community according to shared interests or traits. For example, social networking users may connect to and interact with other users who are geographically near each other. This allows users to interact in many advantageous manners with other users who are interested in similar ideas by doing things such as sharing important bulletins, soliciting advice about local landmarks, and generally meeting and interacting with neighbors.

As online communities and digital networks grow rapidly, a providing service's user base expands exponentially, and security issues become increasingly complex for these providers. Malicious actors may attempt to use online communities to gain access to private information or exploit location-based interactions between users. For example, a malicious actor may attempt to pose as a member of a neighborhood or community and solicit personal information from valid community users in order to exploit their trust. The success of malicious actors is the detriment of law-abiding service users and the reputation and revenue of the provider.

To prevent exploiting by malicious actors, a digital networking service may require verification of its users before they can access a community or private group. The service may attempt to verify that a user belongs to a particular community prior to providing that user access to the corresponding community. As the user base grows, it becomes an increasingly demanding task to verify the multitude of new users of location-based communities while preserving sufficient levels of security to keep malicious actors at bay.

Current methods of verifying users consists of manual interactions with a user to verify their membership in a community. For example, when verifying that a digital user belongs to a community grouped by geographical location, a postcard may be sent to that prospective digital user at an address within the geographical location. The postcard may contain some information which will allow the user to verify their membership in the location-based community. Some methods of verification may include personal meetings or phone calls to verify critical information for verification. Other methods include direct comparisons between established data, such as phone numbers and billing addresses of applicants. Such information is often stored and facilitated by third parties vendors, requiring an authenticating service to rely on outside entities and use precious time and resources to complete verification processes. Such solutions are difficult to sustain and cost valuable time and resources to manage, especially with the user base of a social networking site increasing in large magnitudes every day.

SUMMARY

The appended claims may serve as a summary of the invention.

DETAILED DESCRIPTION

Figure 1:
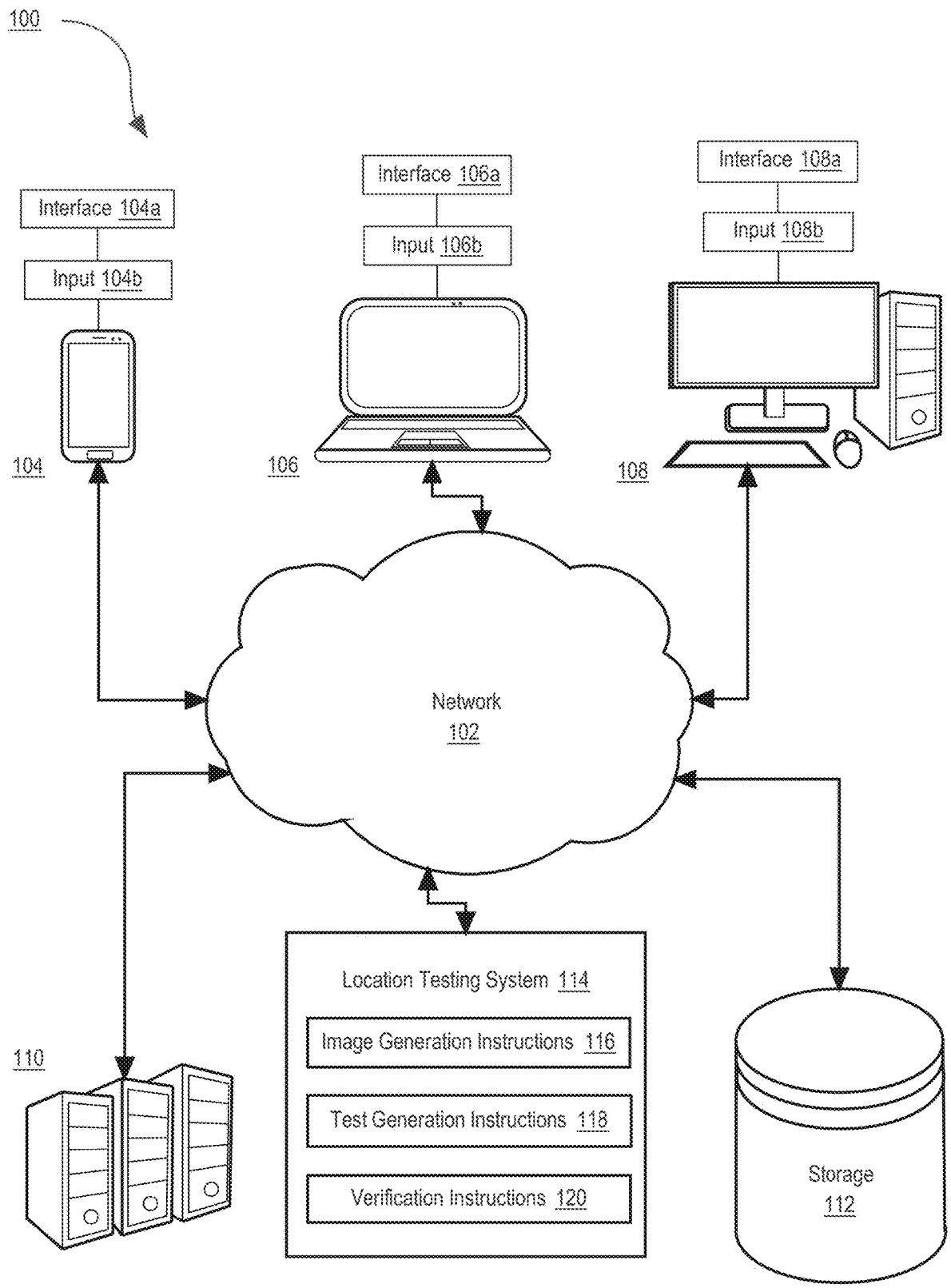
FIG. 1 illustrates an example networked computer system with which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are disclosed in sections according to the following outline:

1. GENERAL OVERVIEW
2. EXAMPLE COMPUTER SYSTEMS AND PROCESSES
   2.1. EXAMPLE STRUCTURAL SYSTEMS
   2.2. EXAMPLE PROCESSES
3. GEOGRAPHICAL VERIFICATION EMBODIMENTS
   3.1. REQUESTS FOR VERIFICATION AND EMBODIMENTS
   3.2. VERIFICATION THROUGH LOCATION TESTING AND EMBODIMENTS
   3.3. ADDITIONAL TESTING PROCESSES AND EMBODIMENTS
4. IMPLEMENTATION EXAMPLES AND OVERVIEWS
   4.1. IMPLEMENTATION EXAMPLE—HARDWARE OVERVIEW
   4.2. IMPLEMENTATION EXAMPLE—SOFTWARE OVERVIEW
   4.3. IMPLEMENTATION EXAMPLE—CLOUD COMPUTING
5. PRACTICAL APPLICATIONS

1. General Overview

In various implementations, a computer-implemented method facilitates the generation and maintenance of testing protocols and processes which may be used to verify online users of a social networking platform. Social networking bases groups which admit or deny users based on their residence in a particular community may utilize the user's personal location, knowledge of an area, or personal interaction with a verification process to determine whether or not a user account should be verified on one of these online communities. A location-based test may be easily sourced from existing information and verified users of a community and provided to prospective members of the community to determine whether to admit that prospective member into the community.

The computer-implemented method may be utilized to maintain a user account database, the user account database comprising data records representing a plurality of user accounts, each user account of the plurality of user accounts being associated with location data. The user account database may track and report the relationships of a number of users of a social networking service with geographic locations. For example, the user account database may track a number of location-based communities and neighborhoods and additionally track a plurality of verified users which have been determined to reside at postal addresses within the geographic boundaries of those communities. The database may be further utilized to determine whether a prospective user is known to be a member of the community, and if not, provide information relevant to the testing or verification of that user for access to the community.

The computer-implemented method may be further utilized to receive a request, from a device associated with a requesting user account, to associate the requesting user account with a verified location. The request may be generated in response to a new user of the online service creating an account or requesting access to a neighborhood or community group which the user alleges they should belong to. A computer system may use the existence or generation of such a request to automatically and/or responsively begin a testing protocol or method which will verify whether or not the user is an active member of the community.

The computer-implemented method may be further utilized to generate and send, to the device associated with the requesting user account and based on the verified location, one or more location tests, each location test of the one or more location tests comprising a digital representation of a location, and an input interface, the input interface comprising interactive input options for the requesting user account. A digital representation of a location may be a computer generated or supplied symbol or image that is commonly associated or seen within a community or neighborhood. For example, a photograph of a small store popular with local members of a community but not well known outside of the community is a potentially excellent testing subject for verifying a user.

The one or more location tests may be administered to a prospective user account to determine the user's familiarity with a set of images or inquiries. Verification of the user account may depend on their answering or inputting responses to the one or more location tests in a pattern consistent with the behaviors which would be exhibited by an active member of the community. For example, a prospective user account that does not recognize a small store popular with community locals may be denied access to the community group or subject to more rigorous verification processes in future verification attempts.

The computer-implemented method may be further utilized to determine result data for the one or more location tests based on input from the device associated with the requesting user account in response to receiving the one or more location tests. Tracking and determining result data generated from the results of testing a user account will provide insight into the user's reaction and response to various elements of the test. Simple results will provide effective insight. For example, a user account answering a yes-or-no question regarding their familiarity with a landmark in a neighborhood. Complex results will also provide relevant insight. For example, the input and response times detected during a test taking period may help identify and flag suspicious behavior, such as computer-assisted test-taking software or scripts which attempt to automatically verify a user without the necessary human input.

The computer-implemented method may be further utilized to, based on the result data, determining whether to associate the requesting user account with the verified location in the user account database. Result data gleaned from input detection during the testing period may be used to determine that a user account is likely to be, or not to be, a member of a geographically based community based on the nature of the input received. Determinations may be positive or negative based on the result data and data interpretation. For example, a set of successful test results may result in the computer-implemented method determining that a user is likely a member of a neighborhood and therefore should be verified with respect to that neighborhood. As a counterexample, a set of negative test results may result in the computer-implemented method determining that the user account is likely a malicious actor or is attempting to verify an incorrect neighborhood. Various countermeasures may be taken in response to this negative determination depending the level of severity of the negative results.

By utilizing location-based testing processes and systems, social networking service providers can verify a much higher volume of prospective users in a shorter period of time without devoting critical resources previously needed to complete those procedures. The digital electronic methods of verification provided herein allow service providers to test for verification on a wide scale, to a wide audience of prospective users. Additionally, existing data and content already within the social networking platform may be leveraged to generate and improve testing continuously in order to improve verification techniques at a constant rate. The elimination of costly manual labor for verification and the implementation of a digital testing environment allows for a high throughput of verified users, a reduction in malicious access attempts, and improves user experiences for users and service providers alike.

Technical improvements are also created with this computer-implemented method. Previous methods of manually tracking and verifying users through manual means required complex tracking of logistics and items related to verification. The computer-implemented methods provided herein allow the consolidation of verification processes and systems into a single, simple testing mechanism that may be reused and repurposed for multiple users, thus improving resource utilization and efficient expenditure. Additionally, social networking service providers may leverage existing data and services already in use to generate and improve the verification process, allowing resources already in use to serve multiple purposes as both information/entertainment features as well as testing subjects, at least effectively doubling the value of expended computing and electronic resources.

2. Example Computer Systems and Processes

2.1. Example Structural Systems

FIG. 1 illustrates an example networked computer system with which various implementations may be practiced. FIG. 1 is shown in simplified, schematic format for purposes of illustrating a clear example and other implementations may include more, fewer, or different elements. System 100 comprises various entities and devices which may be used to practice an implementation. Network 102 is a network entity which facilitates communication between entities depicted in FIG. 1. Connection to network 102 is shown by double-sided arrows between a connecting entity and network 102. Network 102 may be any electronic communication medium or hub which facilitates communications between two or more entities, including but not limited to, an internet, an intranet, a local area connection, a cloud-based connection, a wireless connection, a radio connection, a physical electronic bus, or any other medium over which digital and electronic information may be sent and received.

Location testing system 114 is connected to network 102, and is an entity which allows the parsing and recognition of data entering and leaving a social network platform. Location testing system 114 may be any hardware, software, virtual machine, or general-purpose entity capable of performing the processes discussed herein. In various implementations, location testing system 114 is a software program integrated into an online community platform being facilitated from the digital computing device or device network. In various implementations, location testing system 114 is a module integrated into an online community system capable of manipulating digital communications and digital communication groups as discussed herein.

Location testing system 114 comprises image generation instructions 116. Image generation instructions 116 may be a set of digital or electronic instructions which allow the creation, generation, reception, sending, or storing of digital images or digital representations of objects. For example, image generation instructions 116 may be designed to access stored images or digital representations of locations in order to provide that data for location-based testing through location testing system 114. In various implementations, image generation instructions 116 may access databases or devices such as those described herein in order to facilitate the use of images in location-based testing.

Location testing system 114 comprises test generation instructions 118. Test generation instructions 118 may be a set of digital or electronic instructions which allow the generation of location-based tests for verification processes. For example, test generation instructions 118 may generate or maintain tests designed to verify prosecutive users' membership in a number of location or community-based groups on a social networking platform. In various implementations, test generation instructions 118 store information relating to a number of previously administered location-based tests and the results of those tests. The results may be used to improve or re-generate previously utilized tests to perfect location-based testing for future users to provide the most efficient process for verification possible.

Location testing system 114 comprises verification instructions 120. Verification instructions 120 may be a set of digital or electronic instructions which allow the verification or association of a prospective user with a particular location, community, or group. For example, verification instructions 120 may be designed to access a database such as those described herein in order to verify users with a location or community. More specifically, a verification process executed according to verification instructions 120 may change an entry in a database to indicate that a user account has performed successfully in a number of location-based tests and is verified with respect to a particular location.

Devices 104-108 are user account devices/entities which allow individual users to interact with an online community platform through network 102. Devices 104-108 may be any devices capable of connection to network 102 through any method described herein. Devices 104-108 may comprise various programs, modules, or software, including an input 104b-108b and an interface 104a-108a. In various implementations, devices 104-108 utilize inputs 104b-108b to interact with aspects of a digital networking platform such as a social media service. The input is tracked by the service for purposes of processes like location-based testing and association of the input with a particular user, user account, or device will aid in tracking and performing verification processes. The interaction between the online community platform, including location-based testing, may be facilitated by a user interface generated and maintained by interface modules 104a-108a which receive user input at devices 104-108 and convert the input to contextual digital actions on the online community platform.

Any device which may connect to network 102 to access an online community platform may be one of devices 104-108 and any number of devices may be used, including a smaller or larger number of devices than those depicted in FIG. 1. For example, FIG. 1 depicts a mobile device 104 which comprises an input 104b and an interface 104a to connect and interact with an online community platform. A mobile computing device 106 and a hard-wired computing device 108 may contain similar features implemented on different hardware or software platforms.

Server 110 may be any number of individual or linked servers which facilitate the creation, maintenance, or administration of location-based testing for a geographic community. For example, server 110 may store data relating to a backend framework for an online community platform and location-based testing which is accessible to any of devices 104-108. In various implementations, a backend framework represented by stored data in server 110 is accessible to location testing system 114 in order to allow the creation and administration of location-based testing according to the embodiments discussed herein.

Storage 112 may be any number of individual or linked storage devices or mediums which allow the storage of digital data related to the processes or embodiments discussed herein. For example, storage 112 may store data relating to previous location-based tests or results to aid in improving or regenerating the tests. In various implementations, location testing system 114, server 110 and storage 112 communicate over network 102 to provide, to devices 104-108, an online community platform comprising a backend environment populated with user profiles interacting through various communication mediums, including verification processes to associate the profiles with a particular location. In various implementations, system 100 is designed to execute process 200 described below.

2.2. Example Processes

Figure 2:
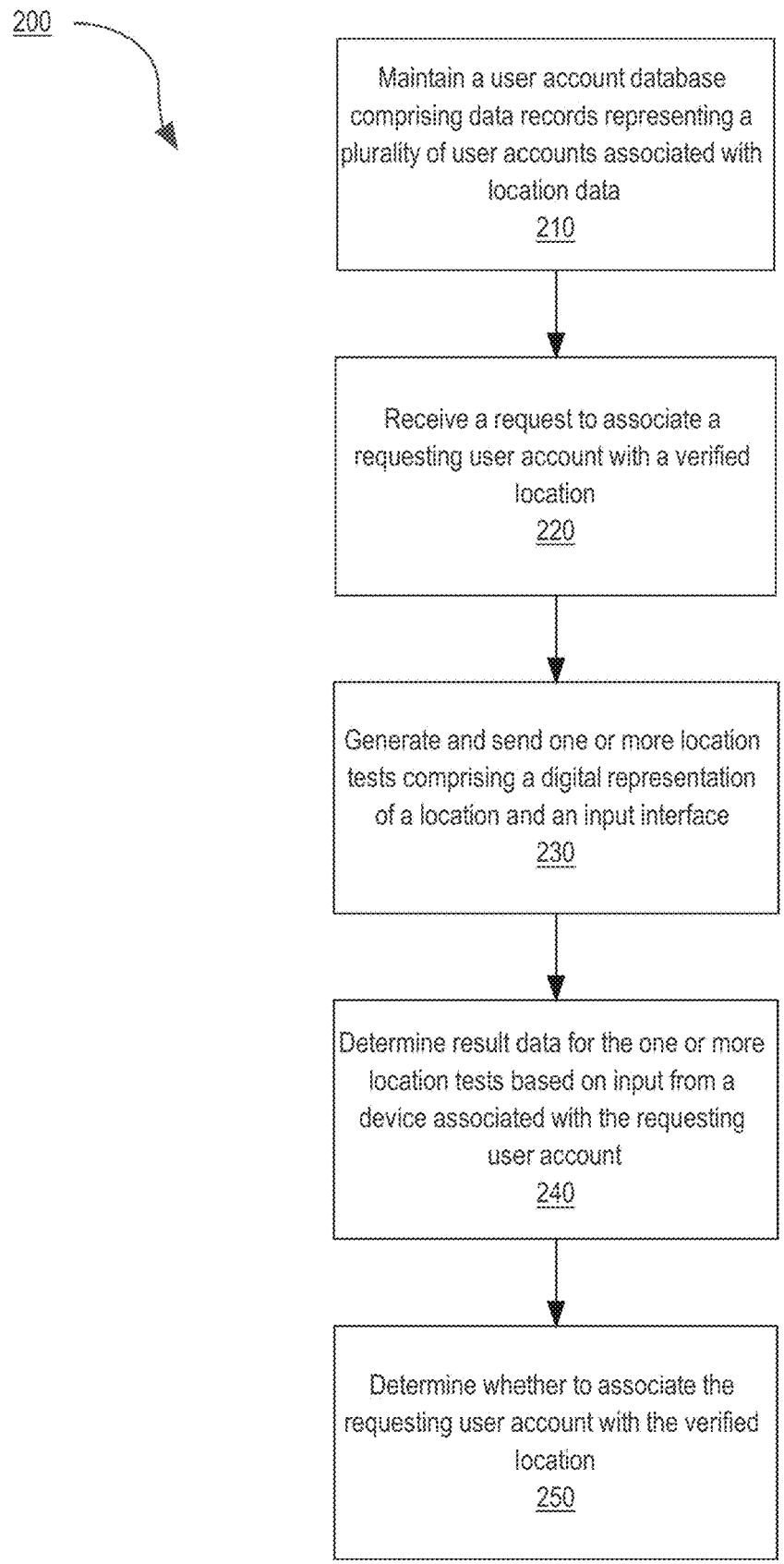
FIG. 2 illustrates a digital geographical verification process according to various embodiments.

FIG. 2 illustrates a digital geographical verification process according to various embodiments. FIG. 2 is shown in simplified, schematic format for purposes of illustrating a clear example and other embodiments may include more, fewer, or different elements connected in various manners. FIG. 2 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

The process depicted in FIG. 2 begins at step 210 by maintaining a user account database, the user account database comprising data records representing a plurality of user accounts, each user account of the plurality of user accounts being associated with location data. In various embodiments the user account database is maintained by an entity or administrator of a social networking service. For example, an administrative device such as device 108 may facilitate and maintain an electronic database through server 110 by manipulating data stored in storage 112.

The user account database may be any database which contains information relevant to the processes and systems described herein. For example, the user account database may contain electronic data in a digital memory medium which corresponds to accounts of users associated with a social networking service. The accounts of users may additionally correspond to one or more locations which represent the residence or domicile of a human associated with the account. The user account database may be a general database which links any number of entities with any number of verified locations known to a service. Any relationship between an entity and a geolocation may be represented by the data in the database. For example, the data may indicate a verification between the account and a location representing the verified nature of the account's presence as a resident or domiciliary of that location. In another example, an operator of a business or other commercial entity within the boundaries of the verified location may be required to perform a similar or different number of tests to verify the commercial entity with the verified location.

In an embodiment the status of associated or unassociated of a user account and a verified location is binary. In various embodiments, the status of association of a user account with a verified location is based on a level or degree of association between a user account and a location. The degree of association may correspond to a level of permission that a user account attains regarding the verified location. For example, a base degree of association may indicate that a user is not associated with a verified location. A secondary degree of association may indicate that a user is associated with a verified location, but has not acquired any further privilege within a community associated with the verified location. A tertiary degree of association may indicate that a user is associated with a verified location and has access to various resources within an online service, such as commercial services or direct interaction with other verified users. In an embodiment, a higher degree of association may indicate a user is an employee of an entity facilitating the verified location service and/or an administrator of an online community corresponding to a verified location.

At step 220, the process comprises receiving a request to associate a requesting user account with a verified location. In various embodiments, a user account associated with a user of a social networking service generates and sends the request to an administrator of the service to attempt to verify an association of the user account with the location. In various further embodiments, the request is received by a device associated with the user or an account associated with the user. In various embodiments, the verification request is performed automatically and/or in response to the creation of a new user account for a social networking service. For example, a requirement for the creation of an account with a social networking service may be the specification of a neighborhood or community that a user is active in. When a user utilizes a client interface at a device to create a user account, the account may require that a user verify their active location before the account can be created.

In various embodiments, the location for verification is automatically selected based on the user's geographical information taken directly from data stored at a user device, such as Global Positioning Satellite (GPS) or Wireless Fidelity (WiFi) data. When an embodiment is implemented using a mobile device app, the app may be programmed to call a location service of the operating system of the mobile device to retrieve then-current location data. In various embodiments, a user account inputs a location directly into a client service for verification, or may select a location from a list generated by the client service, and a user account may request verification or start a verification process by manually generating input at an interactive element of a device. Examples of input for requesting verification are explored below, including in FIG. 4 discussed hereafter.

In various embodiments, a request is generated as a means to access a higher privilege or secure level of a service. For example, a user account already associated with a verified location may request access to a secondary service or group resource. In various further embodiments, a user account generates a request for a resource associated with a secondary level of access that is distinct from the verified location. For example, a user account already associated with a verified location may request access to a "for sale" digital group operated by a social networking service and associated with the verified location. To gain access to the resource, the user account may be required to complete a secondary set of location-based tests. In various further embodiments, a secondary location-based test is a more difficult test for a user account to complete compared to verified location testing. In various further embodiments, user accounts are granted verified access by the service automatically or manually by an administrator of the service without being required to request access through normal means. In various embodiments, a user account is granted a verified status through the service. The verified status indicates the association of the user account with a level of privilege that accords the user account with a level of trustworthiness or consistency within the service. In various further embodiments, the level of privilege of a user account is associated with a badge or other indication of the level of trustworthiness that a user account has attained with the service.

At step 230, the process comprises generating and sending one or more location tests, each location test of the one or more location tests comprising a digital representation of a location, and an input interface. In various embodiments, the one or more location tests are sent to a device associated with a requesting user account which originally requested the verification. In various embodiments, the one or more location tests are interactive tests or challenges presented to a user account requiring user input to resolve. For example, a location test may be associated with multiple resolution conditions, including a success condition, a failure indication, and/or a neutral condition. A success condition may indicate that a test was "passed" by a user account based on the input supplied during the test. A failure condition may indicate that a test was "failed" by a user account based on the input supplied during the test. A neutral condition may indicate that no discernable result or a result which does not support success or failure was generated during the test.

In various embodiments, a location test is a test for familiarity or recognition of a digital representation of a location. The test condition will be determined based on the users input in response to viewing the digital representation. For example, a requesting user may be shown an image or photograph of a location. The requesting user will then be prompted for input indicating whether they recognize the digital representation to correspond to a real-world location within the verified location the requesting user previously indicated as their domicile. In various embodiments, the digital representation is a digital image of a location within the verified location for which the user is requesting verification. In this case, confirming the shown location is within the verified location is a success condition, denying the location is within the verified location is a failure condition, and other actions may be considered neutral conditions.

In various embodiments, the digital representation is a digital image of a location that is not within the boundaries of the verified location for which the user account is requesting verification. In this case, confirming the shown location is within the verified location is a failure condition, denying the location is within the verified location is a success condition, and other actions may be considered neutral conditions. In various further embodiments, some conditions are considered partial conditions and affect the results of testing differently. For example, denying that a digital representation of a beach is within the boundaries of a landlocked verified location may only be considered a partial-success condition since actual knowledge of the verified location is not required to reach a success condition during that test.

In various embodiments, third-party services may be utilized to provide relevant data or digital representations to supplement testing. For example, images or digital data may be procured from a third-party service which hosts local data corresponding to physical locations. The images may be obtained manually by a user or automatically by a system designed to automatically parse third-party services to obtain the data. In various further embodiments, a service may automatically and responsively gather a digital representation in response to receiving a request for verification for a device.

In various embodiments, the one or more tests contain digital representations of locations which are stored and maintained by the social networking service. For example, a service may store a large number of digital representations for a plurality of locations corresponding to verified locations. In various further embodiments, these digital representations are generated by other aspects of the service that are not analogous to testing, such as business reviews, information sharing, neighborhood bulletins, real-estate listings, etc. In various embodiments, the digital representations may be symbols. For example, a popular slogan, symbol, trademark, or other symbol/feature known within the verified location may be presented to the user, such as a well-known mascot for a pizza restaurant within the verified location.

In various embodiments, the input interface comprises one or more interactive elements for a user or device to interact with elements of the one or more location tests. For example, interactive buttons may be displayed to a test-taking user in order to allow them to generate the success, failure, and neutral conditions upon viewing the digital representation. In various embodiments, the device and/or service tracks the input at the device with regard to any metric of input. Examples of tracked input include, the elements interacted with, the speed with which interaction occurs, the time between interactions, the total number of interactions, the presence of tactile user interaction or feedback, or any other metric which may be useful to the service.

In various embodiments, the device or service may determine that input generated in response to the tests is not indicative of manual input by a human user. For example, many "bot" or automatic input behaviors which attempt to gain access to a service without human input may be detected and cataloged by the social networking service. In various embodiments, in response to determining the presence of non-human, automated, or scripted input during a test, the service may take responsive action, including automatic generation of a failure condition, flagging an offending user profile, or banning the user profile.

In various embodiments, the input received may comprise data inherent to a user account or device. Information or data received from a device or a user account operating an application on a device may be useful to supplement and/or replace input from a user of the device. Such information includes, but is not limited to, geolocation data, Internet Protocol (IP) address data, device platform data, firmware data, advertiser ID data, security data, and/or fingerprint data. In various embodiments, the inherent data received is used to supplement the determination of result data for the one or more location tests. For example, comparison of an IP address with geolocation data may indicate that input from a device is being received from a location which is very far away from the verified location. In another example, platform-provided Advertiser IDs are compared to a number of known IDs to determine the validity of a device's specific ID. In yet another example, fingerprinting data or other security data such as passcode usage is compared to libraries of security data to determine if it is more or less likely that a physical user is utilizing a proper user account on a device in order to request validation.

At step 240, the process comprises determining result data for the one or more location tests based on input from a device associated with the requesting user account. In various embodiments, determining the result data comprises determining a number of conditions generated by input during the pendency of the one or more location tests. For example, the service may collect and/or track and compile the various conditions in the result data as a summary of the results of the location testing.

At step 250, the process comprises determining whether to associate the requesting user account with the verified location. In various embodiments, determining whether to associate the requesting user account with the verified location comprises determining that a number of successful, failure, and/or neutral conditions are present in the result data. In various further embodiments, the number of tracked conditions is compared to a threshold number of results to determine whether to associate the requesting user account with the verified location.

For example, a determination that a requesting user account should be associated with a verified location comprises determining that a user account has achieved a success condition on at least 75% of all location tests, has achieved no more than a 25% failure condition on all location tests, and has not been associated with any non-human autonomous interaction. In various embodiments, the thresholds are combined or compared according to testing type. For example, a determination to associate a requesting user account with a verified location may comprise determining that a user account achieved a success condition on at least 75% of all location tests showing a digital representation of a location within the verified location and a success condition al at least 75% of all location tests showing a digital representation of a location not within the verified location.

In various embodiments, associating the requesting user account with the verified location comprises creating, deleting, or otherwise altering any data within the user account database to indicate that the requesting user account is associated with the verified location. Once this has been achieved, the requesting user account is now a verified user account according to the service.

In various embodiments not depicted in FIG. 2, a location test may comprise multiple digital representations and multiple input options. For example, a location test may comprise a series of digital representations which are interactive, and the resulting conditions of the test are based on the input for each of, or the totality of, the digital representations. In various embodiments, a location test comprises multiple different digital representations which a user account may select if they believe those representations are in a neighborhood. In various embodiments, a location test comprises a single digital representation with multiple sub-sectors which may be interacted with according to data received from a user account and indicating familiarity with a location.

In various embodiments not depicted in FIG. 2, the one or more location tests may further be associated with individual weights for each test. For example, tests which have been determined to be more difficult to successfully pass may be associated with a lesser weight value than other tests that are more indicative of input by an average user account. In various further embodiments, a social networking service utilizes the weight values of each tests in the determination of the result data.

Figure 3:
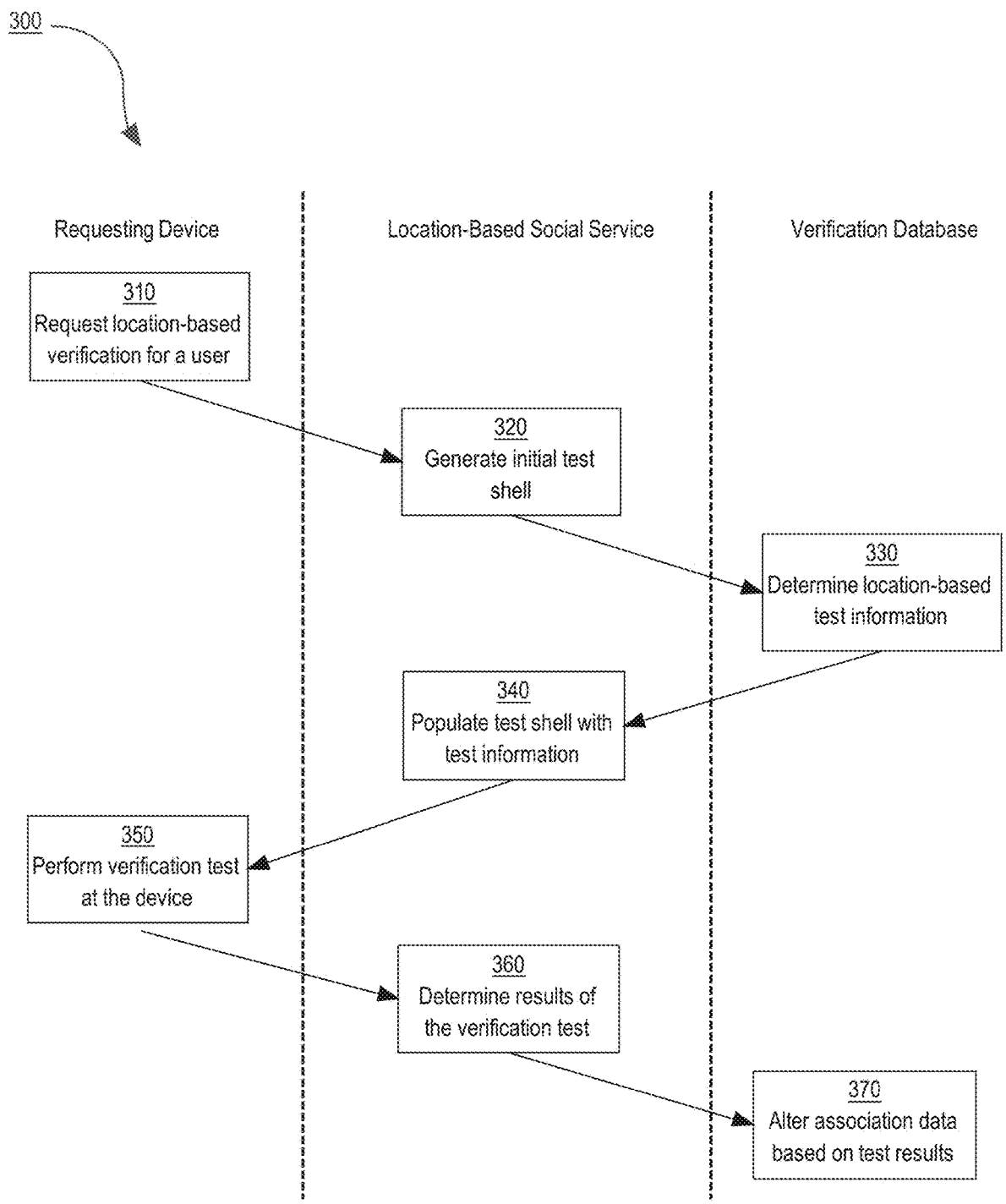
FIG. 3 illustrates a digital geographical verification process utilizing a networked computer system according to various embodiments.

FIG. 3 illustrates a digital geographical verification process utilizing a networked computer system according to various embodiments. FIG. 3 is shown in simplified, schematic format for purposes of illustrating a clear example and other embodiments may include more, fewer, or different elements connected in various manners. FIG. 3 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

The process depicted in FIG. 3 begins at step 310 by requesting location-based verification for a user. The request is generated at a requesting device, for example, device 104. The request may be generated by a social networking client software installed at the requesting device and is sent to a location-based social service facilitating a social networking service on a host device, such as server 110. For example, a user of a mobile device hosting a social networking client requests verification of their user account with a verified location. At step 320, the process comprises generating an initial test shell. The initial test shell may be generated by the location-based social service and may be performed in response to receiving the request for verification from the requesting device. An initial test shell may be a placeholder file or data representing one or more potential location tests which will be generated to test the requesting user. For example, the service may generate test information comprising a pre-determined set of inputs and prompts, but lacking digital representations of locations needed for the location tests.

At step 330, the process comprises determining location-based test information. The determination may be made by a verification database or storage and made be performed in response to the location-based social service generating the initial test shell. The verification database may send the location-based test information back to the location-based social service in order to populate the initial test shell with the necessary information to generate one or more location tests. For example, the database may receive an indication that the requesting device is attempting to associate the user with the verified location and responsively pull, from the database memory, digital image or photographs corresponding to the verified location.

At step 340, the process comprises populating the test shell with test information. The population of the test shell may be performed by the location-based social service in response to receiving the location-based test information. Once the test shell has been fully populated with location-based test information, the one or more location tests may be sent back to the requesting device. For example, once the location-based social service receives the digital photographs or images of the verified location from the verification database, it may populate the one or more location tests with that information, and send the tests to the requesting device.

At step 350, the process comprises performing verification testing at the requesting device. The verification testing may be performed at the requesting device and may be based on input gleaned from the device during the testing process as described above. The input may be any input received before, during, or after testing has concluded. The input may be any input as discussed herein, including direct input from a user, indirect input from a user, input from a device, inherent device data received, or any other input which is relevant to the processes described. Once the testing is performed and completed, the requesting device may send data corresponding to input back to the location-based social service. For example, the requesting device may store indications of buttons pressed by a user account in association with the displayed digital images or photographs for the consideration of the service.

At step 360, the process comprises determining the results of the verification test. Determining the results of the verification test may be performed in any manner acceptable to the location-based social service, including the methods described herein. For example, the location-based social service may receive the inputs from the requesting device associated with each digital representation shown and determine a number of success, failure, and neutral conditions. The conditional responses may be compiled, and a determination may be made of whether the account of the requesting user account is to be associated with the requesting device. For example, the location-based social service may determine that the requesting device has performed input which corresponds to a threshold number of success conditions and therefore the user account should be associated with the verified location.

At step 370, the process comprises altering association data based on the test results. For example, if the location-based social service has determined to associate the user account with the verified location, the service may send instructions to the verification database to alter the data stored thereon in order to indicate the association between the user account and the verified location. Alteration may comprise storing a flag value in a verification status column, for example, which may be read by other processes to determine and act upon the status of the user account.

3. Geographical Verification Embodiments

FIG. 4, FIG. 5, FIG. 6A, FIG. 6B, FIG. 7, FIG. 8 illustrate various embodiments of a computer display device that is displaying a graphical user interface for verification processes under stored program control. Each of FIG. 4, FIG. 5, FIG. 6A, FIG. 6B, FIG. 7, FIG. 8 is now described in terms of the structure shown in the drawing figures, and functions that may be programmed as part of a mobile device application, server application, or combination. Thus, the combination of FIG. 4, FIG. 5, FIG. 6A, FIG. 6B, FIG. 7, FIG. 8 and the functional description of the following subsections are intended as an outline, plan, or algorithm that can be programmed to produce working embodiments to execute the described functions.

3.1. Requests for Verification and Embodiments

Figure 4:
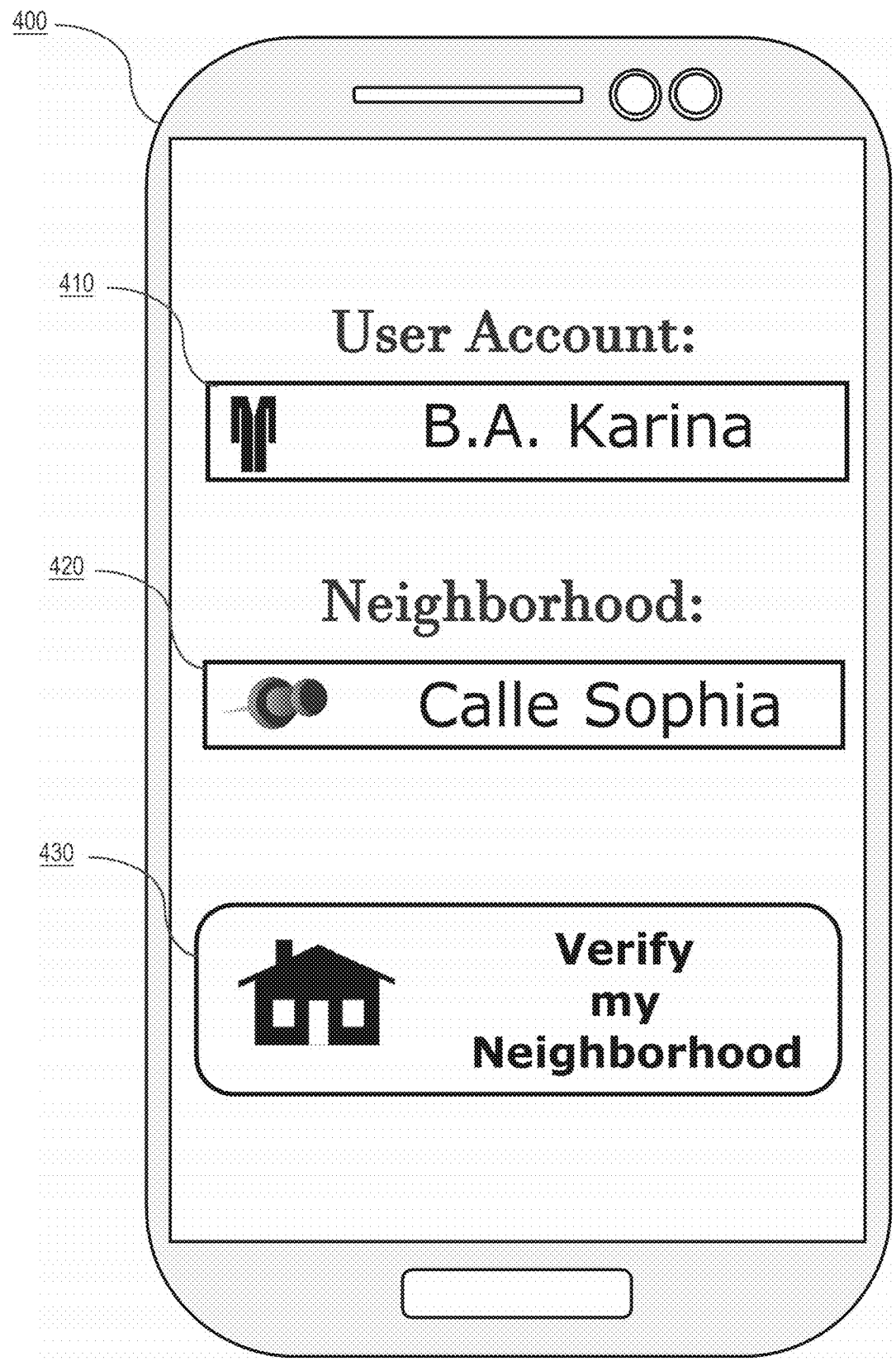
FIG. 4 illustrates a computer display device that is displaying a graphical user interface for a digital geographical verification process under stored program control according to various embodiments.

FIG. 4 illustrates a computer display device that is displaying a graphical user interface for a digital geographical verification process under stored program control according to various embodiments. FIG. 4, and each other drawing figure herein showing a graphical user interface, is intended to depict a computer display device and the output that has been generated under stored program control using the functions that are described in the subsections below.

The graphical user interface shown in FIG. 4 corresponds to an embodiment in which a requesting user account utilizing a mobile device may begin the verification testing process by requesting association with the verified location. As depicted in FIG. 4, a device 400, such as mobile device 104, is programmed to output a graphical user interface for requesting verification of a user account. The interface may comprise any number of elements or interactive entities for requesting verification of a user account with an associated location. For example, user block 410 contains a field displaying identifying account information for the requesting user account.

The requesting user account depicted in FIG. 4 is B. A. KARINA and corresponds to a user account which is requesting verification with a location. Neighborhood block 420 in an input field which specifies the geographical location for which the user account is seeking verification. The verified location depicted in FIG. 4 is CALLE SOPHIA, which is a neighborhood in which user account B. A. KARINA alleges to be domiciled for the purposes of participating in the social networking service. An input may be accepted to begin the verification processes described herein. For example, verification button 430 as depicted in FIG. 4 is an interactive button that may be pressed or otherwise interacted with to begin a verification process such as those described in FIG. 2 and/or FIG. 3.

3.2. Verification Through Location Testing and Embodiments

Figure 5:
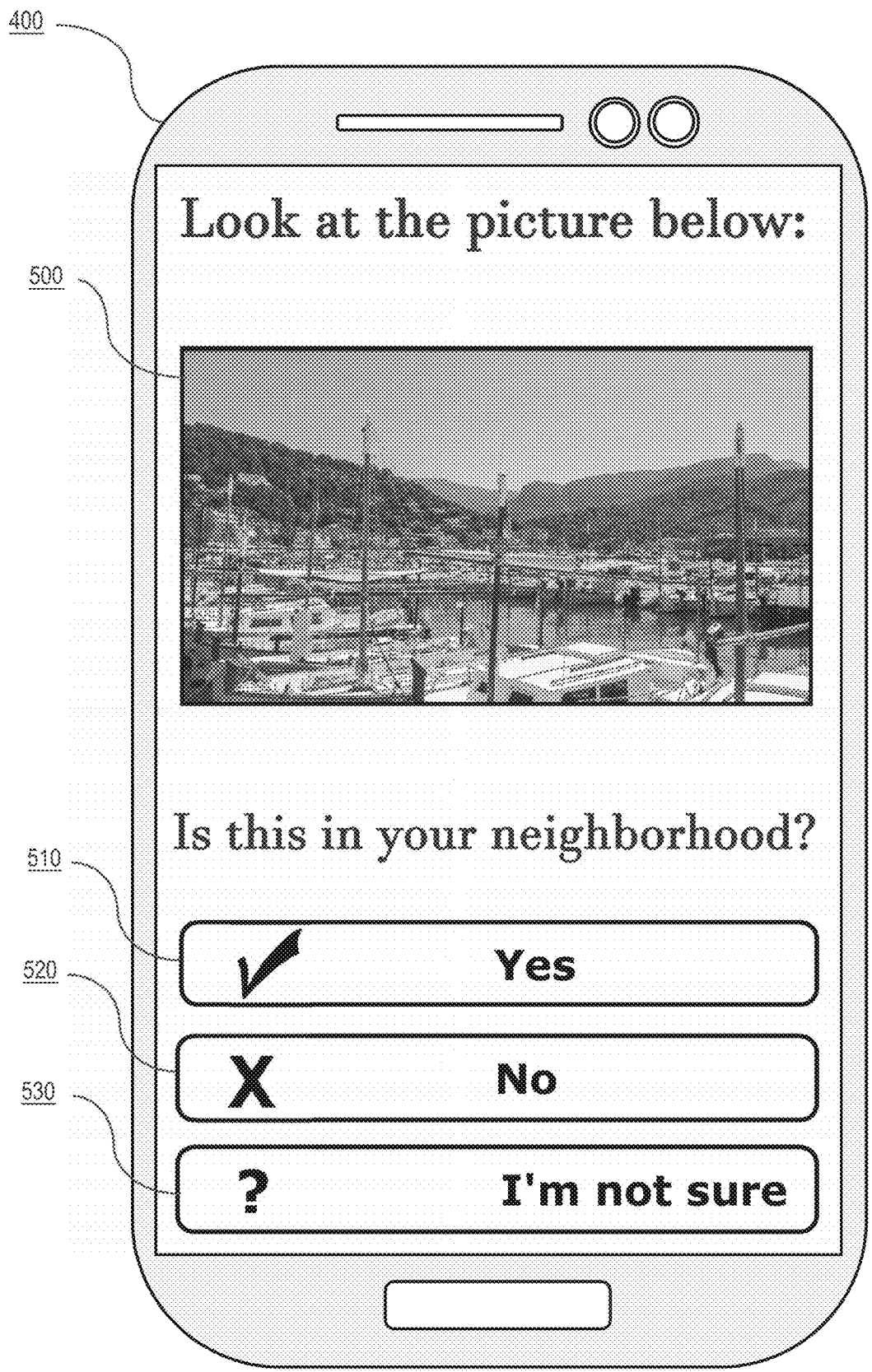
FIG. 5 illustrates a computer display device that is displaying a graphical user interface for a digital geographical verification process under stored program control according to various embodiments.

FIG. 5 illustrates a computer display device that is displaying a graphical user interface for a digital geographical verification process under stored program control according to various embodiments. The graphical user interface shown corresponds to an embodiment in which a requesting user account is presented with a location test as part of the verification process.

As depicted in FIG. 5, the device 400 is actively engaged in location-based testing using a digital representation in conjunction with several interactive input fields. The test is performed in a graphical user interface implemented on device 400. The interface comprises a digital representation 500 of a location. For example, the digital representation 500 depicted in FIG. 5 includes a photograph of a harbor which may or may not be a part of the CALLE SOPHIA neighborhood that the requesting user account is attempting to become verified in. Interactive buttons allow the user account to generate input for the test according to their familiarity with the digital representation 500.

Affirmative button 510 responds affirmatively to the test. Negative button 520 responds negatively to the test. Neutral button 530 may generate new portions of a test or proceed to subsequent portions of a test. For example, if the digital representation 500 corresponds to a location within the CALLE SOPHIA neighborhood, the selection of the affirmative button 510 will generate a successful condition for the depicted test, whereas the selection of the negative button 520 will generate a failure condition for the depicted test. Selection of the neutral button 530 may generate a neutral condition indicating that a user is not familiar enough with the particular location in order to answer the question.

In various embodiments, the selection of a neutral button or the generation of a neutral condition may be weighted or considered as a relevant factor in the final determination of whether to associate the requesting user account with a verified location. For example, frequent selection of the neutral button 530 may indicate a malicious actor is attempting to bypass the test, causing the test to be regenerated or the requesting user to be prevented from taking further tests.

3.3. Additional Testing Processes and Embodiments

Figure 6A:
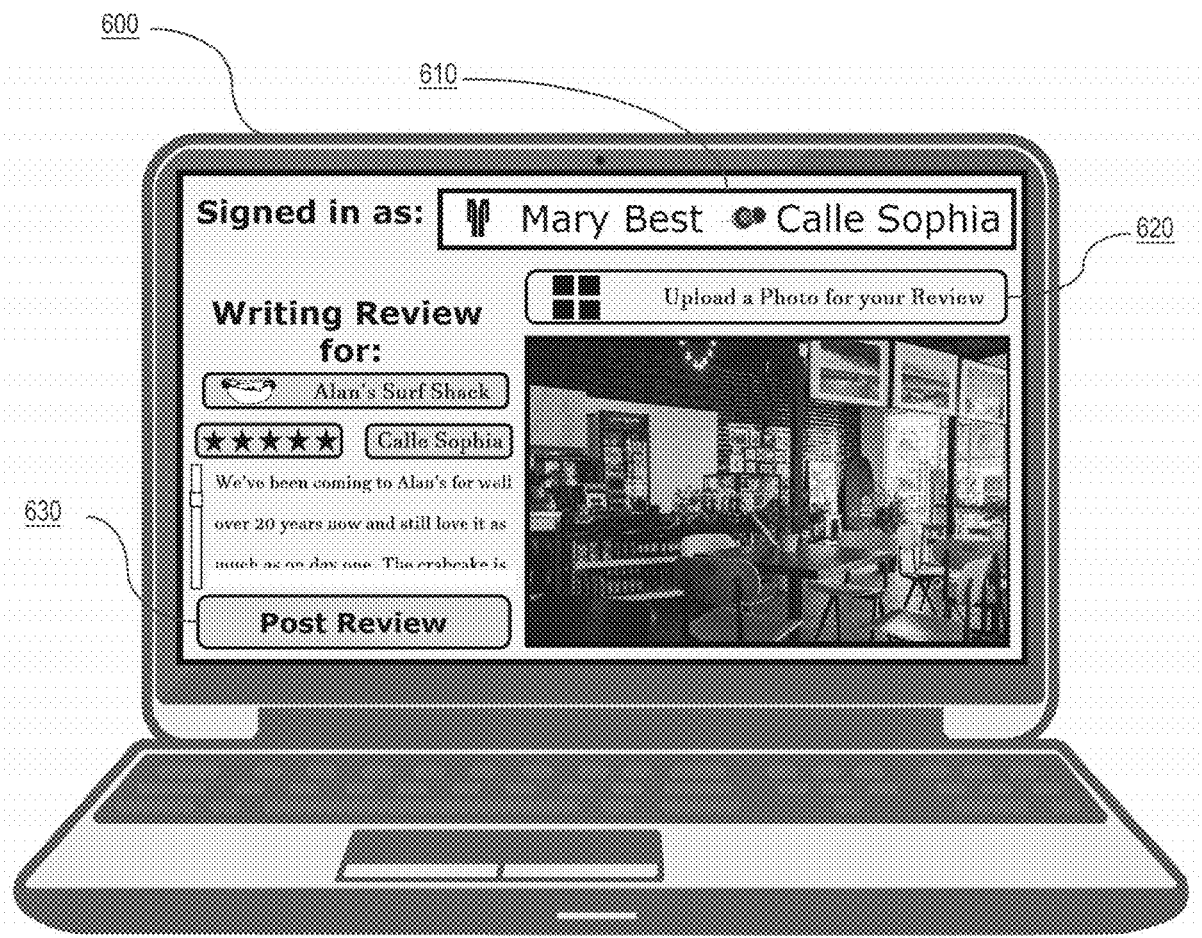
FIG. 6A illustrates a computer display device that is displaying a graphical user interface for a digital geographical verification process under stored program control according to various embodiments.

FIG. 6A illustrates a computer display device that is displaying a graphical user interface for a digital geographical verification process under stored program control according to various embodiments. The graphical user interface corresponds to an embodiment in which a verified user account may interact with elements of a social networking service.

As depicted in FIG. 6 a device 600, such as mobile computing device 106, depicts a graphical user interface for reviewing or otherwise interacting with a local landmark in a verified location. User block 610 specifies the user of an account or device associated with the interaction. For example, FIG. 6 depicts a verified user account MARY BEST who is a resident of CALLE SOPHIA generating a restaurant review for ALAN'S SURF SHACK in the CALLE SOPHIA neighborhood. As part of the review, the social networking service may allow MARY BEST the option to upload a photo of the location for the consideration of other members of the CALLE SOPHIA neighborhood. Photo upload button 620 allows the verified user to upload a photo into their review in this manner. Interaction button 630 allows the verified user to interact on the social networking service by posting their review of the restaurant to the public or the other verified members of the CALLE SOPHIA neighborhood.

Figure 6B:
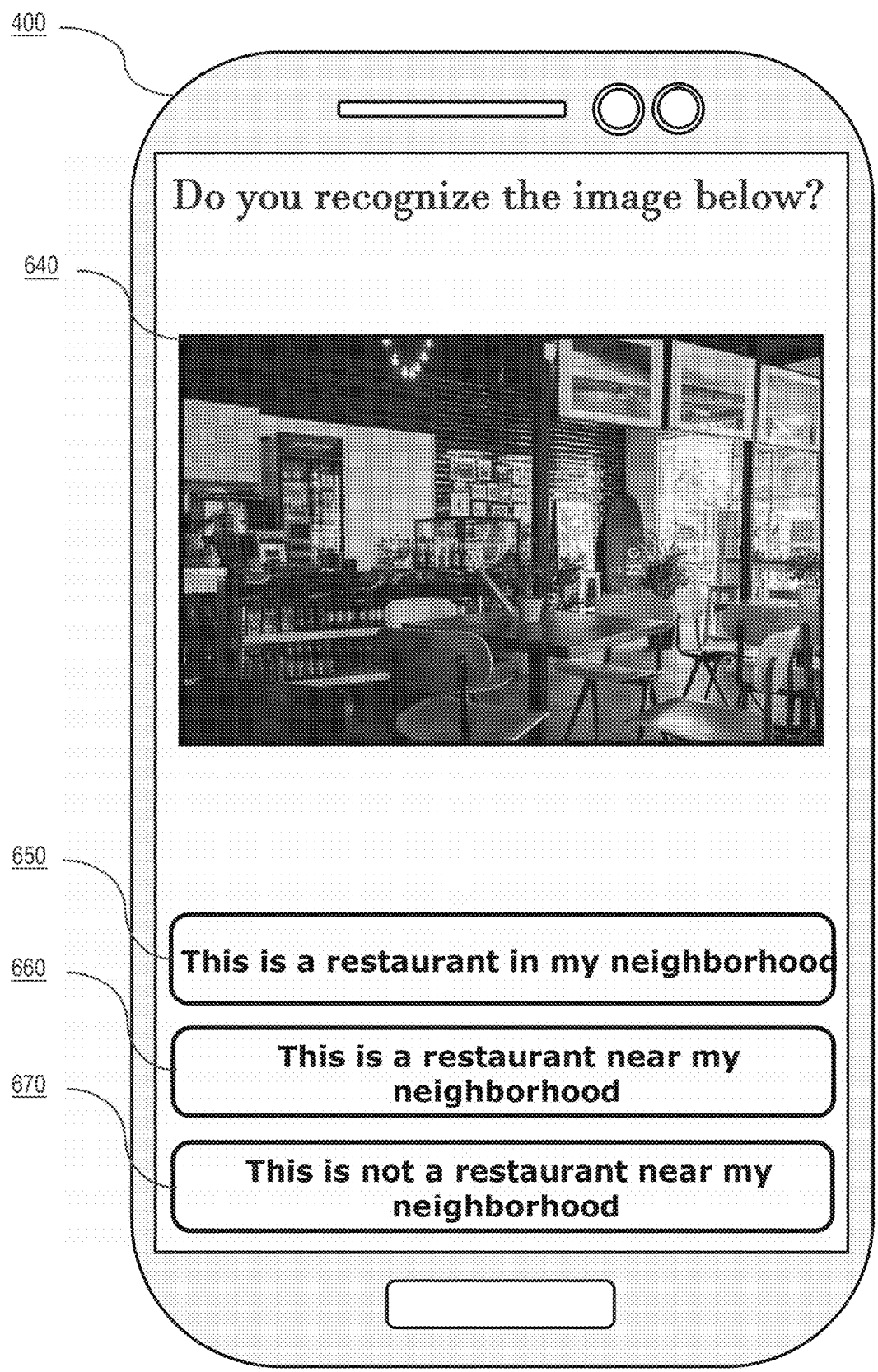
FIG. 6B illustrates a computer display device that is displaying a graphical user interface for a digital geographical verification process under stored program control according to various embodiments.

FIG. 6B illustrates a computer display device that is displaying a graphical user interface for a digital geographical verification process under stored program control according to various embodiments. The graphical user interface shown corresponds to an embodiment in which uploaded digital representations may be repurposed by a social networking service in order to generate more accurate or comprehensive location tests.

As depicted in FIG. 6, the requesting user account is performing a test utilizing the graphical user interface at device 400. Test image 640 is a similar image to the uploaded photo shown in FIG. 6A. For example, the photograph uploaded by account MARY BEST of ALAN'S SURF SHACK may be reused as a digital representation of the verified neighborhood of CALLE SOPHIA for testing. Input buttons are shown which allow the requesting user account to interact with the test. The button may be altered or generated to show contextual information to aid a requesting user account in generating input for the test. For example, affirmative button 650 is modified to contain contextual information for the requesting user account by specifying that the location is a restaurant without naming the actual restaurant. Such contextual information may help user accounts specify input for depicted locations while not providing overtly helpful hints to accounts associated with users who do not live in the corresponding neighborhood. Affirmative button 650 will provide an affirmative input when interacted with.

In various embodiments, the one or more tests may include one or more misleading hints which suggest a wrong answer instead of a correct answer. In various further embodiments, the one or more misleading hints comprise a phrase designed to suggest a wrong answer is in fact a correct answer. For example, a test may comprise a digital representation of a bakery in the verified location and an interactive input comprising the phrase "this is a bike shop in my neighborhood." The misleading hint may cause a non-user entity such as a digital test-taking entity to be more likely to select the incorrect answer based on the text of the interactive input instead of an interpretation of the digital representation.

Conditional affirmative button 660 is modified to contain contextual information for the user and will provide a conditional affirmative input when interacted with. For example, a user who lives in a neighborhood but does not have a perfect memory of the boundaries of their neighborhood may answer conditionally. If ALAN'S SURF SHACK is in CALLE SOPHIA but a resident can only recall the restaurants proximity to the neighborhood without knowing its exact location, a conditional affirmative answer may provide a degree of successful condition on the test without unfairly rewarding or punishing the user for a scant memory. Negative button 670 is modified to contain contextual information for the user and will provide a negative input when interacted with.

Figure 7:
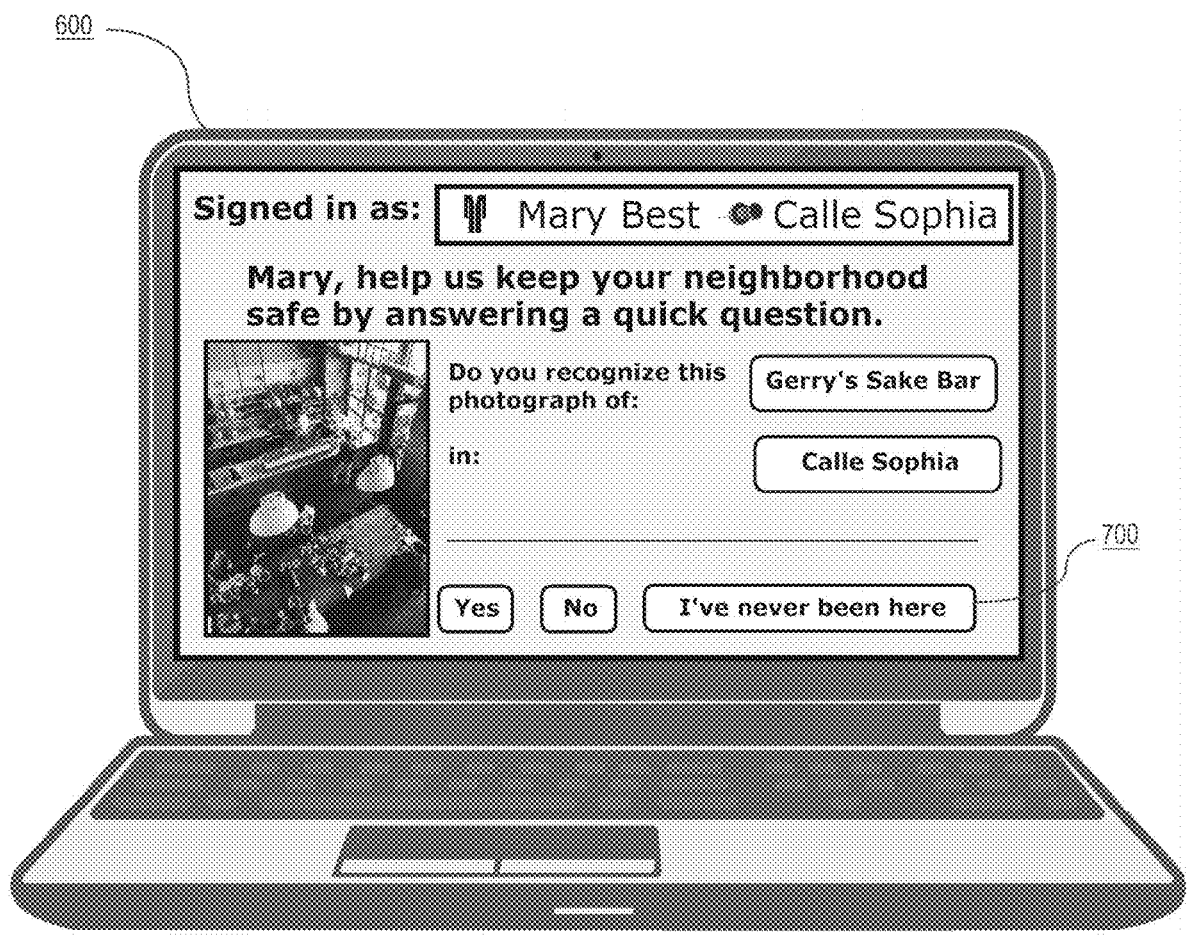
FIG. 7 illustrates a computer display device that is displaying a graphical user interface for a digital geographical verification process under stored program control according to various embodiments.

FIG. 7 illustrates a computer display device that is displaying a graphical user interface for a digital geographical verification process under stored program control according to various embodiments. The user interface corresponds to an embodiment in which a verified user may interact with the social networking service in order to provide feedback and improve location-based testing. As depicted in FIG. 7, the device 600 is engaged in an affirmation test for user account MARY BEST. Input from the device 600 may select affirmative or negative options for the affirmation test. The test may be altered based on the responses of the verified user account. For example, as a verified user account, MARY BEST may be considered an authoritative figure with regard to depictions of the CALLE SOPHIA neighborhood.

If the user account provides input indicating recognition of the photograph of GERRY'S SAKE BAR in CALLE SOPHIA, the social networking service may determine to use the photograph in future location testing processes. If the user account does not provide input to recognize the photograph, despite being verified in the neighborhood, future location tests may be altered to exclude the photograph. The user account may also select dismissal button 700 as input to specify an inability to judge the image, which could be tagged with a reduced confidence value or excluded from future location tests.

In various embodiments, a machine learning system or process is applied to the process of location-based testing and verification to improve test generation and results. For example, a machine learning system may test and track responses to a number of tests as well as the verification result data associated with those tests. According to the rates of success, failure, neutral results, and the input associated with each test, the machine learning system may create, delete, alter, re-generate, or otherwise affect new or existing location-based tests to improve overall efficiency of testing processes.

Figure 8:
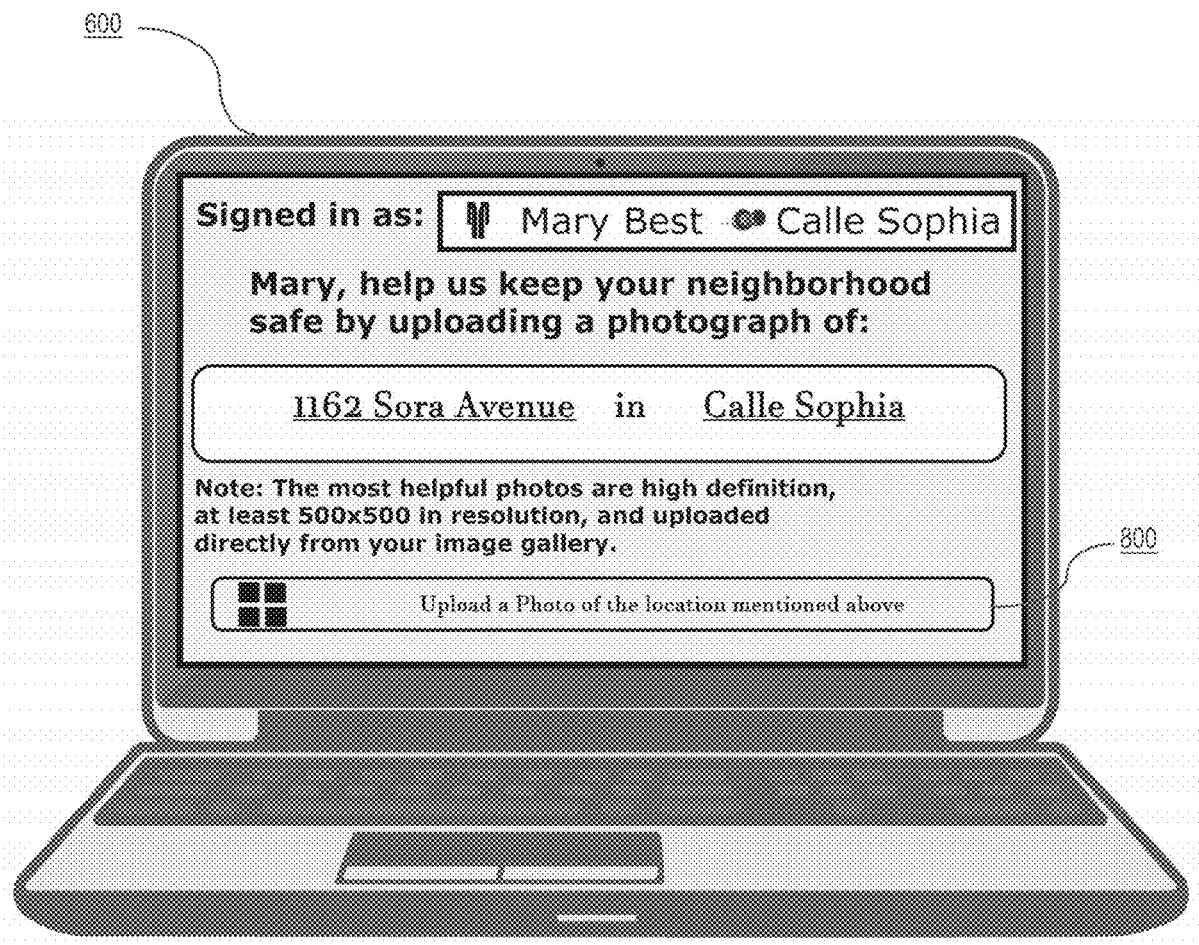
FIG. 8 illustrates a computer display device that is displaying a graphical user interface for a digital geographical verification process under stored program control according to various embodiments.

FIG. 8 illustrates a computer display device that is displaying a graphical user interface for a digital geographical verification process under stored program control according to various embodiments. The graphical user interface shown corresponds to an embodiment in which a verified user is prompted for input regarding local digital representations that are not already stored by the social networking service.

As depicted in FIG. 8, the device 600 is engaged in an improvement request for future test generation. Verified user account MARY BEST has been sent a request by the service to upload a photo of the address 1162 SORA AVENUE in the CALLE SOPHIA neighborhood. For example, the request may occur in response to a programmed determination that a photograph of 1162 SORA AVENUE is not currently stored in a system database for testing. The verified user may upload a photograph or digital representation using photo upload button 800 to provide this information to the service for use in future testing. In various embodiments, the requests for the service may comprise instructions or other information clarifying preferred embodiments of photographs or digital representations of locations.

In some embodiments, the image that is uploaded via button 800 is subject to embargo, or an evaluation workflow, to ensure that it is genuine and trustworthy. Evaluation can include programmed tests such as inspecting location metadata that is attached to the image to determine if the location metadata is consistent with the address.

4. Implementation Examples and Overviews

4.1. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
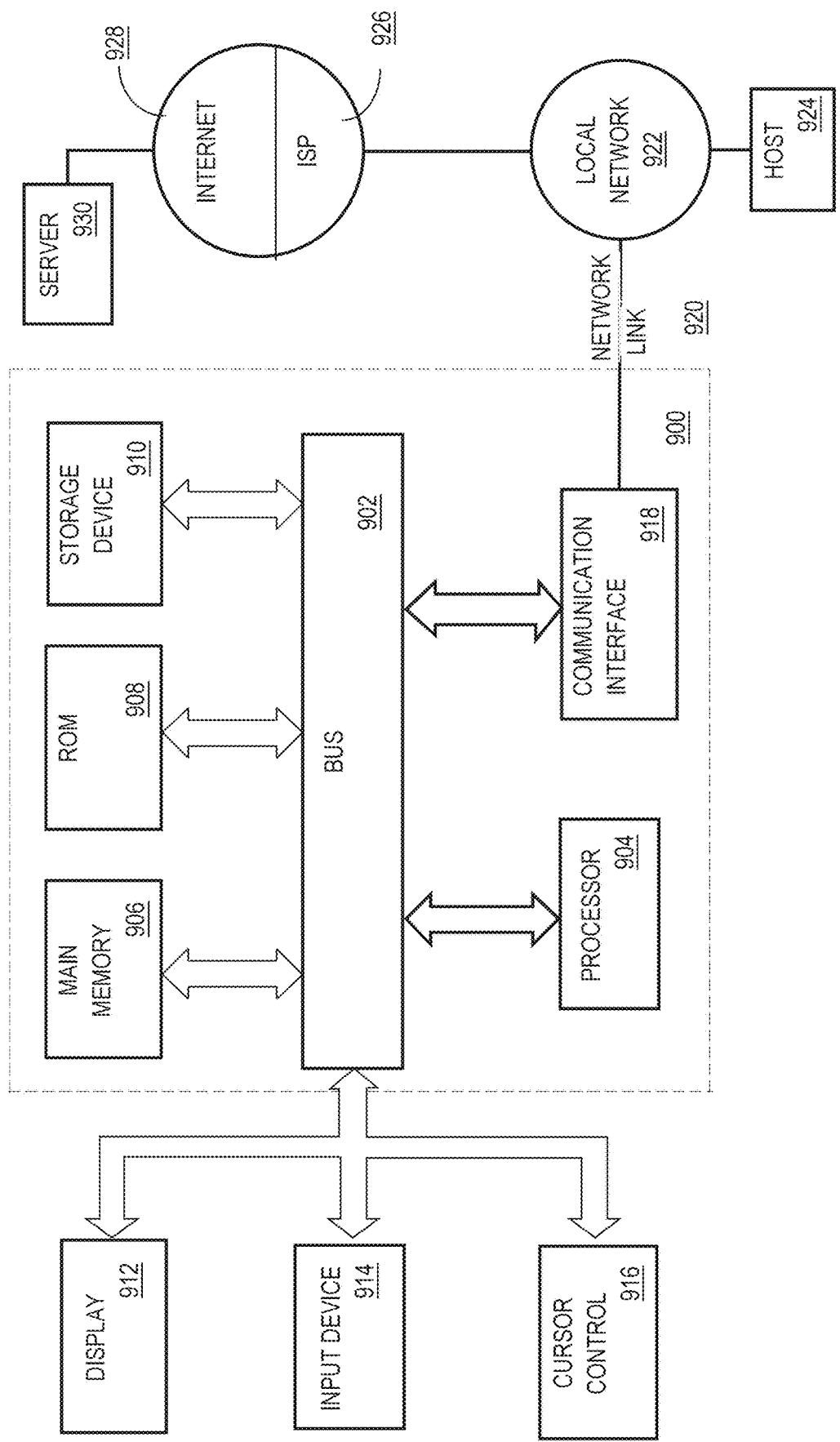
FIG. 9 illustrates an example computer system with which an embodiment may be implemented.

For example, FIG. 9 is a block diagram that illustrates a computer system 900 upon which an embodiment may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Non-volatile media may also include persistent memory, such as MRAM or PCM, like 3DXPoint from Intel which can be used as a part of main memory. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

4.2. Implementation Example—Software Overview

Figure 10:
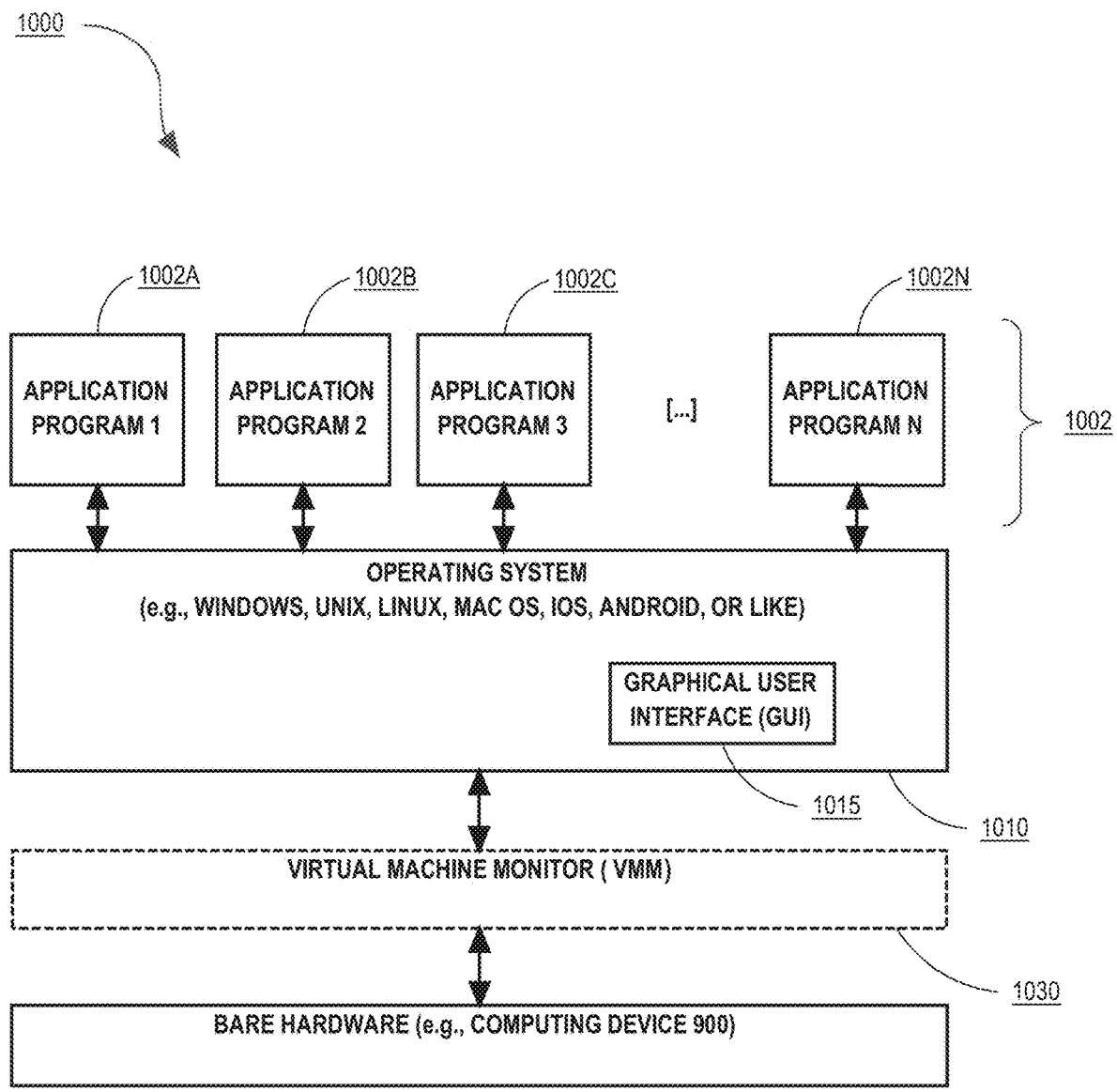
FIG. 10 illustrates an example software system with which an embodiment may be implemented.

FIG. 10 is a block diagram of a software system 1000 that may be employed for controlling the operation of computer system 1000. Software system 1000 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1000 is provided for directing the operation of computer system 500. Software system 1000, which may be stored in system memory (RAM) and on fixed storage (e.g., hard disk or flash memory) 910, includes a kernel or operating system (OS) 1010.

The OS 1010 manages low-level aspects of computer operation, including managing execution of processes, memory allocation, file input and output (I/O), and device I/O. One or more application programs, represented as 1002A, 1002B, 1002C . . . 1002N, may be "loaded" (e.g., transferred from fixed storage into memory) for execution by the system. The applications or other software intended for use on the system may also be stored as a set of downloadable computer-executable instructions, for example, for downloading and installation from an Internet location (e.g., a Web server, an app store, or other online service).

Software system 1000 includes a graphical user interface (GUI) 1015, for receiving user commands and data in a graphical (e.g., "point-and-click" or "touch gesture") fashion. These inputs, in turn, may be acted upon by the system 900 in accordance with instructions from operating system 1010 and/or application(s) 1002. The GUI 1015 also serves to display the results of operation from the OS 1010 and application(s) 1002, whereupon the user may supply additional inputs or terminate the session (e.g., log off).

OS 1010 can execute directly on bare hardware (e.g., processor(s)) utilizing system 1000. Alternatively, a hypervisor or virtual machine monitor (VMM) 1030 may be interposed between the bare hardware and the OS 1010. In this configuration, VMM 1030 acts as a software "cushion" or virtualization layer between the OS 1010 and the bare hardware of the system.

VMM 1030 instantiates and runs one or more virtual machine instances ("guest machines"). Each guest machine comprises a "guest" operating system, such as OS 1010, and one or more applications, such as application(s) 1002, designed to execute on the guest operating system. The VMM 1030 presents the guest operating systems with a virtual operating platform and manages the execution of the guest operating systems.

In some instances, the VMM 1030 may allow a guest operating system to run as if it is running on the bare hardware of a system directly. In these instances, the same version of the guest operating system configured to execute on the bare hardware directly may also execute on VMM 1030 without modification or reconfiguration. In other words, VMM 1030 may provide full hardware and CPU virtualization to a guest operating system in some instances.

In other instances, a guest operating system may be specially designed or configured to execute on VMM 1030 for efficiency. In these instances, the guest operating system is "aware" that it executes on a virtual machine monitor. In other words, VMM 1030 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

4.3. Implementation Example—Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/ private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

5. PRACTICAL APPLICATIONS

When considered in light of the specification herein, and its character as a whole, this disclosure is directed to improvements in the verification and user retention of social networking and other online services associated with location and geographic data. The disclosure is not intended to cover or claim the abstract model of remembering an image or recalling a detail or a photograph. By centralizing the process of testing users in response to request for verification, a social networking service may more efficiently retain users and prevent malicious actions without the tedious and expensive manual interactions previously needed for user verification. Thus, implementation of the invention described herein may have tangible benefits in increased computer resource utilization, reduction in compromised information flow, and/or improvements in the actual computers and security systems.

Practical application of the embodiments described herein include automatically generating, without human input, tests for verifying users with a particular location in an online community-based service. Further practical applications include, automatically sourcing and generating testing information from previous verified users and interactions between users and entities in a social networking service. Other practical applications include machine learning systems for automatically implementing and utilizing location-based testing models to improve user experience and efficiency with verification systems through regular modification.

What is claimed is:
1. A computer-implemented method comprising:
maintaining a user account database, the user account database comprising data records representing a plurality of user accounts, each user account of the plurality of user accounts being associated with location data;
receiving a request, from a device associated with a requesting user account of a user, to associate the requesting user account with a verified location within a community;
generating and sending, to the device associated with the requesting user account and based on the verified location, one or more location tests,
each location test of the one or more location tests comprising a digital representation of a location, of one or more locations other than the verified location, within the community,
each digital representation of the location, of the one or more locations, being commonly associated or seen within the community and known to members of the community but not well-known outside of the community, and
an input interface, the input interface comprising interactive input options for the requesting user account to provide an input indicating a user's familiarity with one or more locations;
determining result data for the one or more location tests based on the input received from the device associated with the requesting user account in response to receiving the one or more location tests; and
based on the result data indicating the user's familiarity with the one or more locations included in the one or more location tests, determining a degree of association between the requesting user account and the verified location in the user account database.

2. The computer-implemented method of claim 1, wherein:
a digital representation of a location comprises a digital image of a physical location being displayed on the device associated with the requesting user account;
determining result data for the one or more location tests comprises determining a number of success indicators and a number of failure indicators for the one or more location tests based on the input from the device associated with the requesting user account, the input from the device comprising one or more input activities occurring during a display of particular digital image of a physical location;
determining a degree of association between the requesting user account and the verified location comprises analyzing the number of success indicators and the number of failure indicators to determine whether a verification metric is met, and only in response to determining that the verification metric is met, associating the requesting user account with the verified location in the user account database.

3. The computer-implemented method of claim 2, wherein analyzing the number of success indicators and the number of failure indicators to determine whether a verification metric is met comprises determining that the number of success indicators is only greater than or equal to a threshold number of success indicators and determining that the number of success indicators is only less than a threshold number of failure indicators to meet the verification metric.

4. The computer-implemented method of claim 1, wherein:

a digital representation of a location comprises multiple digital images of a physical location being displayed concurrently on the device associated with the requesting user account;

determining result data for the one or more location tests comprises concurrently determining a number of success indicators and a number of failure indicators for the one or more location tests based on the input from the device associated with the requesting user account, the input from the device comprising one or more input activities occurring during the concurrent display of the multiple digital images;

determining a degree of association between the requesting user account and the verified location comprises analyzing the number of success indicators and the number of failure indicators to determine whether a success metric is met, and only in response to determining that the success metric is met, associating the requesting user account with the verified location in the user account database.

5. The computer-implemented method of claim 1, further comprising:

receiving data representing an interest interaction event, the interest interaction event corresponding to an interaction between a verified user account associated with the verified location and an interest entity, the interest entity being located at or within physical boundaries of the verified location;

wherein generating the one or more location tests comprises generating at least one location test in which digital representation of a location is a digital representation of the interest entity.

6. The computer-implemented method of claim 1, further comprising:

generating one or more prototype location tests;

sending the one or more prototype location tests to a device associated with a verified user account, the verified user account being associated with the verified location;

determining prototype result data for the one or more prototype location tests, the prototype result data comprising input from the device associated with the verified user account in response to receiving the one or more prototype location tests;

wherein generating the one or more location tests is based on the prototype result data.

7. The computer-implemented method of claim 1, further comprising:

receiving digital location data from a verified user account, the digital location data comprising a verified digital representation of a location at or within the physical boundaries of the verified location;

wherein generating the one or more location tests comprises using the verified digital representation as a digital representation of a location.

8. The computer-implemented method of claim 1, wherein:

each location test of the one or more location tests corresponds to a weighted location value;

determining result data for the one or more location tests further comprises determining a result for each location test of the one or more location tests, the result for each location test being determined based on the input from the device associated with the requesting user account and the corresponding weighted location value of the location test.

9. The computer-implemented method of claim 1, wherein at least one digital representation of a location is a digital representation of a location that is not within physical boundaries of the verified location.

10. The computer-implemented method of claim 1, further comprising:

determining, based on the result data, one or more automatic inputs associated with input from the device associated with the requesting user account, the one or more automatic inputs associated with input actions that are not performable by a human user;

wherein determining a degree of association between the requesting user account and the verified location comprises determining not to associate the requesting user account with the verified location in the user account database based on the determined one or more automatic inputs;

associating, in the user account database, the requesting user account with data indicating the presence of the one or more automatic inputs.

11. A system comprising:

a computing device executing a software service for digital user accounts associated with geographical locations;

a computing device executing a user account database;

a device associated with a user account;

a processor and main memory comprising instructions which, when executed, cause:

maintaining the user account database, the user account database comprising data records representing a plurality of user accounts, each user account of the plurality of user accounts being associated with location data;

receiving a request, from the device associated with the user account, to associate the user account with a verified location;

generating and sending, to the device associated with the requesting user account and based on the verified location, one or more location tests, each location test of the one or more location tests comprising a digital representation of a location, of one or more locations other than the verified location, within the community, each digital representation of the location, of the one or more locations, being commonly associated or seen within the community and known to members of the community but not well-known outside of the community, and an input interface, the input interface comprising interactive input options for the requesting user account to provide an input indicating a user's familiarity with one or more locations;

determining result data for the one or more location tests based on the input received from the device associated with the requesting user account in response to receiving the one or more location tests; and based on the result data indicating the user's familiarity with the one or more locations included in the one or more location tests, determining a degree of association between the requesting user account and the verified location in the user account database.

12. The system of claim 11, wherein:

a digital representation of a location comprises a digital image of a physical location being displayed on the device associated with the requesting user account;

determining result data for the one or more location tests comprises determining a number of success indicators and a number of failure indicators for the one or more location tests based on the input from the device associated with the user account, the input from the device comprising one or more input activities occurring during a display of particular digital image of a physical location;

determining a degree of association between the user account and the verified location comprises analyzing the number of success indicators and the number of failure indicators to determine whether a verification metric is met, and only in response to determining that the verification metric is met, associating the user account with the verified location in the user account database.

13. The system of claim 12, wherein analyzing the number of success indicators and the number of failure indicators to determine whether a verification metric is met comprises determining that the number of success indicators is only greater than or equal to a threshold number of success indicators and determining that the number of success indicators is only less than a threshold number of failure indicators to meet the verification metric.

14. The system of claim 11, wherein:

a digital representation of a location comprises multiple digital images of a physical location being displayed concurrently on the device associated with the user account;

determining result data for the one or more location tests comprises concurrently determining a number of success indicators and a number of failure indicators for the one or more location tests based on the input from the device associated with the user account, the input from the device comprising one or more input activities occurring during the concurrent display of the multiple digital images;

determining a degree of association between the user account and the verified location comprises analyzing the number of success indicators and the number of failure indicators to determine whether a success metric is met, and only in response to determining that the success metric is met, associating the user account with the verified location in the user account database.

15. The system of claim 11, further comprising instructions which, when executed, cause:

receiving data representing an interest interaction event, the interest interaction event corresponding to an interaction between a verified user account associated with the verified location and an interest entity, the interest entity being located at or within physical boundaries of the verified location;

wherein generating the one or more location tests comprises generating at least one location test in which digital representation of a location is a digital representation of the interest entity.

16. The system of claim 11, further comprising instructions which, when executed, cause:

generating one or more prototype location tests;

sending the one or more prototype location tests to a device associated with a verified user account, the verified user account being associated with the verified location;

determining prototype result data for the one or more prototype location tests, the prototype result data comprising input from the device associated with the verified user account in response to receiving the one or more prototype location tests;

wherein generating the one or more location tests is based on the prototype result data.

17. The system of claim 11, further comprising instructions which, when executed, cause:

receiving digital location data from a verified user account, the digital location data comprising a verified digital representation of a location at or within physical boundaries of the verified location;

wherein generating the one or more location tests comprises using the verified digital representation as a digital representation of a location.

18. The system of claim 11, wherein:

each location test of the one or more location tests corresponds to a weighted location value;

determining result data for the one or more location tests further comprises determining a result for each location test of the one or more location tests, the result for each location test being determined based on the input from the device associated with the user account and the corresponding weighted location value of the location test.

19. The system of claim 11, wherein at least one digital representation of a location is a digital representation of a location that is not within physical boundaries of the verified location.

20. The system of claim 11, further comprising instructions which, when executed, cause:

determining, based on the result data, one or more automatic inputs associated with input from the device associated with the user account, the one or more automatic inputs associated with input actions that are not performable by a human user;

wherein determining a degree of association between the user account and the verified location comprises determining not to associate the user account with the verified location in the user account database based on the determined one or more automatic inputs;

associating, in the user account database, the user account with data indicating the presence of the one or more automatic inputs.

* * * * *